(No Model.)

C. MILLER.
PIPE CUTTER.

No. 438,702. Patented Oct. 21, 1890.

Witnesses:
Christ Mullgardt
Hry. Poppenhusen

Inventor:
Chas. Müller

UNITED STATES PATENT OFFICE.

CHARLES MILLER, OF WASHINGTON, MISSOURI.

PIPE-CUTTER.

SPECIFICATION forming part of Letters Patent No. 438,702, dated October 21, 1890.

Application filed September 10, 1890. Serial No. 364,575. (No model.)

*To all whom it may concern:*

Be it known that I, CHARLES MILLER, of Washington, in the county of Franklin and State of Missouri, have invented a new and Improved Tool for Cutting Pipe or Anything Round; and I do hereby declare that the following is a full and exact description of the said invention.

The nature of my invention consists in constructing a tool that will leave the pipe in its original shape without staving it in or out side, thus preventing narrowing the inside passage of the same, nor swelling the outside to prevent the screw-die to take a start. Besides, it is a self-regulating cutter, self-oiling when in use, and cheap, durable, convenient, and simple.

A and B represent the tool in operation, except the outlet for oil, which is closed.

A represents the lower half, which is a hollow cup forming an oil-chamber; has a cap at $a$, but is solid and flat at $b$, with an open slot in it to receive the regulating-screw with its thumb-nut. At C there is a thumb-screw, which serves as a valve for the oil-chamber and regulates the outflow when used. B represents the upper half, with clamp $d$ at one end, fastening to the main bar B with a hinge-joint, and slipping with its round part on tube A, and regulates the position of the cutting-knife by slipping it forward and backward. B is a split at the other end to receive both the cutter as well as the regulating-screw.

Figure 1:
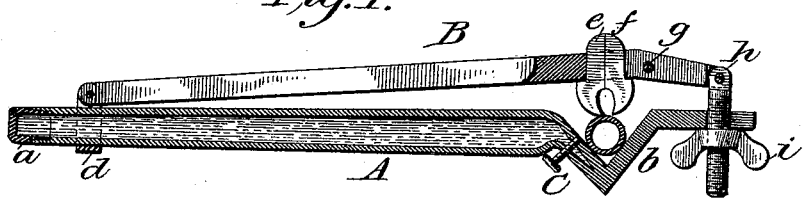
Figure 2:
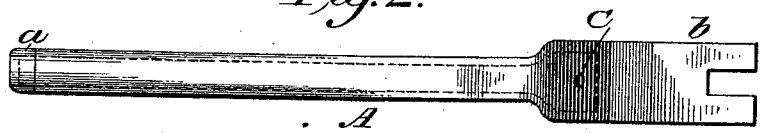
Figure 3:
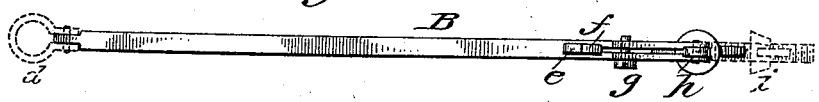

$e$ and $f$ are cutter and guide, Fig. 1. $e$ is the cutter, and $f$ is a guide to prevent the cutter $e$ to enter into the metal too deep, thus avoiding breakage. $e$ and $f$ can be made separate or in one piece.

$g$ is a screw or bolt to hold cutter and guide in.

$h$ is a swivel-joint at the end of bar B, connecting regulating or feed screw with its thumb-nut $i$.

What I claim as my invention, and desire to secure by Letters Patent, is—

1. A self-oiling tube forming a part of a pipe-cutting tool, as described.

2. A cutting device to prevent the cutting-edge to enter the metal any deeper than desired, to prevent breaking, as described.

3. The combination of the whole as a tool for cutting pipe or anything round, in the manner described, and for the purpose set forth.

CHARLES MILLER.

Witnesses:
CHRIST MULLGAROTT,
H. POPPENHUSEN.